United States Patent Office 2,697,101
Patented Dec. 14, 1954

2,697,101

N-(HETEROCYCLIC MERCURI) DERIVATIVES OF HEXACHLORO ENDOPHTHALIMIDE

Morton Kleiman, Chicago, Ill., assignor to Arvey Corporation, a corporation of Illinois No Drawing. Application May 16, 1952,
Serial No. 288,295

2 Claims. (Cl. 260—326)

This invention relates to the production of a new group of compositions of matter. More specifically, this invention relates to a class of compositions conforming with the following structural formula:

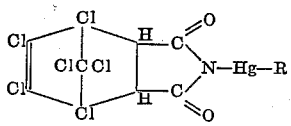

wherein R is a heterocyclic radical containing up to twenty-two carbon atoms. To exemplify the nomenclature of this group of compositions, where R is a thienyl group, the compound is termed N-(α-thienylmercuri)-1,2,3,6-tetrahydro-3,6-endomethano-3,4,5,6,7,7-hexachlorophthalimide. If R represents any other heterocyclic group, the name will conform with that given above, except that the name of the group will be susbtituted for "thienyl." Thus, where R is 3-pyridyl, the compound is termed N-(3-pyridylmercuri)-1,2,3,6-tetrahydro - 3,6 - endomethano - 3,4,5,6,7,7 - hexachlorophthalimide; where R is 4-quinolyl, the compound is termed N-(4-quinolylmercuri) - 1,2,3,6 - tetrahydro - 3,6 - endomethano-3,4,5,6,7,7-hexachlorophthalimide; where R is pyranyl the compound is termed N-(pyranylmercuri)-1,2,3,6-tetrahydro-3,6-endomethano-3,4,5,6,7,7-hexachlo - rophthalimide.

Broadly, the products of this invention are prepared by reacting hexachlorocyclopentadiene with maleic anhydride to form the Diels-Alder adduct thereof, reacting said adduct with ammonia or an ammonia producing compound to form the imide of the aforesaid phthalic acid derivative; this imide or an N-metallo derivative thereof is then reacted with RHgX, wherein R is a radical as previously defined, and X is an anion such as chlorine, bromine, iodine, acetate, or nitrate, etc., to result in the desired product.

For clarity the reactions involved are presented schematically below utilizing specific illustrative compounds:

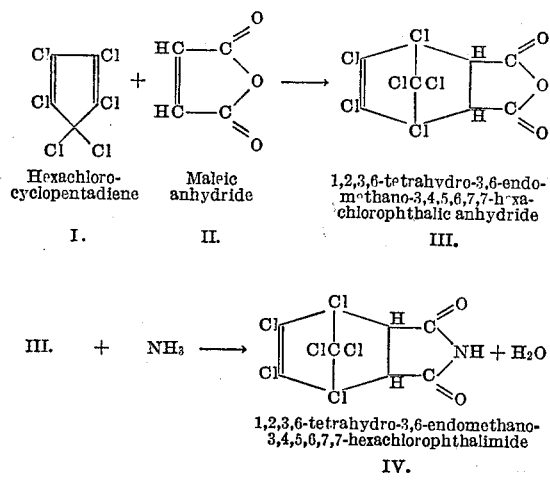

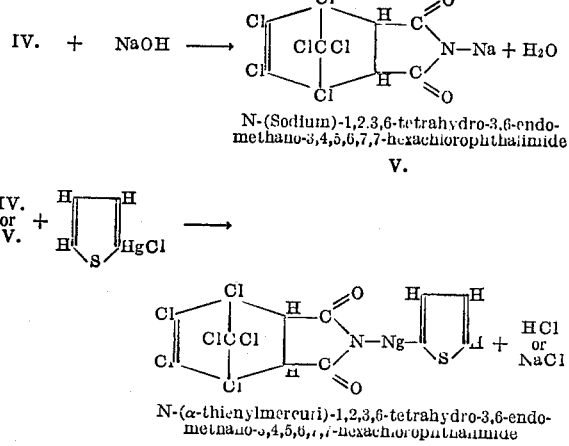

N-(Sodium)-1,2,3,6-tetrahydro-3,6-endomethano-3,4,5,6,7,7-hexachlorophthalimide
V.

N-(α-thienylmercuri)-1,2,3,6-tetrahydro-3,6-endomethano-3,4,5,6,7,7-hexachlorophthalimide
VI.

As an alternative to the method of preparation above described, hexachlorocyclopentadiene may be reacted with maleic acid to form the Diels-Alder adduct, and this adduct can then be treated as described for the adduct of hexachlorocyclopentadiene and maleic anhydride.

According to one method, hexachlorocyclopentadiene and maleic anhydride are reacted together at temperatures between about 110° and 220° C. for from about ten minutes to about ten hours, depending upon the temperature employed. A preferred temperature range wherein the reaction proceeds rapidly and satisfactorily is between about 140° and 180° C. Reaction periods longer than ten hours are not harmful; however, it is preferred that the reaction period be so limited as to minimize decomposition and side reactions. The reaction is preferably carried out in the absence of solvent; however, solvents may be used if desired. Xylene and toluene are among the preferred solvents. Paraffinic solvents may also be used. Since the reaction is one of addition, equal molar quantities of reactants are preferred. An excess of either reactant will not prevent reaction, but is only uneconomical. If a solvent is used, it can be removed from the product by distillation, or else the product may be crystallized by cooling, and removed by filtration. The product can then be purified, if desired, prior to subjecting it to the next step in the process. This can be accomplished by recrystallization from a hydrocarbon solvent such as xylene, heptane or the like.

In accordance with the non-fully equivalent alternative wherein maleic acid is used as a starting material instead of maleic anhydride, maleic acid is adducted with hexachlorocyclopentadiene in the same manner as is maleic anhydride. The product is then treated in the same manner as hereinafter described for the adduct of hexachlorocyclopentadiene and maleic anhydride.

The imide derivative of 1,2,3,6-tetrahydro-3,6-endomethano-3,4,5,6,7,7-hexachlorophthalic anhydride is prepared by reacting said anhydride with ammonia or with an ammonia producing compound, e. g., an ammonium salt, such as ammonium carbonate. Thus, heating said anhydride with ammonium hydroxide will result in a material which, after evaporation to dryness and heating at temperatures of about 100°-250° C. will produce the desired imide. Similarly the fusion of said anhydride with ammonium carbonate results in excellent yields of the desired imide. Alternatively, the anhydride may simply be heated with anhydrous ammonia in an inert solvent such as a hydrocarbon or an ether, and the water formed in the reaction removed by distillation, to produce the imide.

The heterocyclic mercuric-halide can be prepared by means known to the art, such as by reacting the appropriate Grignard reagent with mercuric bromide. One known method involves direct mercuration with a mercury salt in accordance with the scheme $$RH + HgX_2 \rightarrow RHgX + HX$$

A specific example of such reaction is:

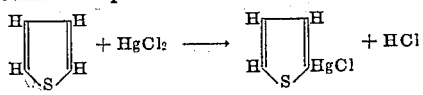 + HgCl₂ ⟶ 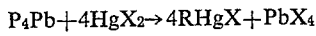 + HCl

Heterocyclic mercuric-halides can also be prepared in accordance with the known method involving the reaction of the appropriate Grignard reagent with mercuric bromide. Another known method is based on the reaction scheme: $R_4Pb + 2HgX_2 \rightarrow 2RHgX + R_2PbX_2$; wherein R is a heterocyclic group and X is iodine, bromine or chlorine. The reaction may also proceed as $$P_4Pb + 4HgX_2 \rightarrow 4RHgX + PbX_4$$

Heterocyclic mercuric nitrate, heterocyclic mercuric acetate, etc., are also prepared by methods known in the art.

The metal salt of the aforementioned imide may be prepared if desired by dissolving the imide in a solvent such as methanol, containing a metal hydroxide. Mixed solvents such as methanol and dioxane may also be used. To the solution of the imide, or its salt formed by the action of the metal hydroxide, is then added the heterocyclic mercuric-halide, acetate, nitrate or other salt, whereupon the metathetical reaction occurs. It is hastened by heating the solution; however, the temperature at which this reaction is carried out is not critical. The final desired product is obtained by removal of any salt formed if it is insoluble in the reaction medium and by concentration and cooling of the reaction mixture. In some solvents such as water, the salt which is formed when the N-metallo-imide is used is soluble and the product precipitates out. Purification of the product may be effected, if desired, by recrystallization from a solvent such as an alcohol, an ether, or a hydrocarbon, although this is generally not necessary since the technical grade product produced above is usually of a high degree of purity.

To illustrate the process resulting in the products of the present invention more clearly, a detailed description of one method thereof is herewith presented.

EXAMPLE

A. *Preparation of 1,2,3,6-tetrahydro-3,6-endomethano-3,4,5,6,7,7-hexachlorophthalic anhydride*

A solution of 6 moles hexachlorocylopentadiene, 6 moles maleic anhydride and 75 ml. xylene was placed in a 3-necked, 3-liter flask equipped with a mechanical stirrer and thermometer. The stirrer was started and the mixture was slowly heated until a temperature of 145° C. was attained. Heating was discontinued and the temperature continued to rise spontaneously 170° C. After the reaction rate had begun to subside, heat was reapplied to maintain the temperature at 160°–170° C. for one additional hour. Heating was then discontinued, and when the temperature had dropped to about 140° C., 75 ml. additional xylene was added; then when the temperature had dropped to about 120° C., one liter of heptane was slowly added with stirring. The reaction mixture was transferred to a beaker, stirred well, and allowed to cool to room temperature. The crystalline product was removed by filtration, washed with hexane, and dried under vacuum. The yield of product having a melting point of 235°–237° C. was 1981 grams (89% of the amount theoretically obtainable).

B. *Preparation of 1,2,3,6-tetrahydro-3,6-endomethano-3,4,5,6,7,7-hexachlorophthalimide*

Hexachlorocyclopentadiene-maleic anhydride adduct (0.1 mole–37.1 grams) was mixed with ammonium carbonate monohydrate (0.1 mole–11.4 grams) in a covered beaker and heated to fusion with stirring. The fused mixture was cooled and dissolved in 400 ml. of boiling xylene. Carbonaceous matter was filtered off and the solution was concentrated to 200 ml. Crystallization resulted readily on cooling. The product was filtered and dried at 110° C. It had a melting point of 274–277° C. and weighed 25.5 grams. The filtrate was further concentrated to result in additional material, the yield totaling about 80% of that theoretically obtainable.

C. *Preparation of 2-chloromercuri thiophene*

The preparation of heterocyclic mercuric compounds is well known in the art. For conveniences, a specific preparation of 2-chloro-mercuri thiophene is herewith presented.

Into a 3-liter vessel was placed mercuric chloride (54 grams; 0.2 mole) dissolved in 900 ml. of water and sodium acetate trihydrate (108 grams; 0.8 mole) dissolved in 400 ml. of water. To the resulting solution was added a third solution of thiophene (17 grams; 0.2 mole) in 200 ml. of ethanol (95%). The mixture was allowed to stand for two days and a solid separated. This solid was removed by filtration, dried, and extracted with hot absolute ethanol. The ethanol extract was allowed to cool and 13.5 grams of solid product crystallized out. The purified product melted at 183° C.

D. *Preparation of the alkali metal salt of 1,2,3,6-tetrahydro - 3,6-endomethano-3,4,5,6,7,7-hexachlorophthalimide*

Potassium hydroxide (0.1 mole; 5.8 grams) was dissolved in absolute methanol (75 ml.) at room temperature, and the resulting solution was added to a boiling solution of 1,2,3,6 - tetrahydro- 3,6 - endomethano-3,4,5,6,7,7 - hexachlorophthalimide (0.1 mole; 37.1 grams) in anhydrous dioxane (75 ml.). The resulting solution, which contained the desired potassium salt of the imide was cooled to room temperature.

E. *Preparation of N-(α-thienylmercuri)-1,2,3,6-tetrahydro-3,6-endomethano-3,4,5,6,7,7-hexachlorophthalmide*

Alpha-chloromercuri thiophene (0.042 mole; 13.5 grams) was dissolved in a mixture of anhydrous dioxane (200 ml.) and absolute methanol (67 ml.) by heating. This solution while still hot was added to the solution described in part D above containing about 0.05 mole of the potassium salt. This mixture was refluxed for 1½ hours in a 500 ml. 3-necked flask equipped with a reflux condenser, stirrer and thermometer. The cooled contents of the flask were poured into 750 ml. of water and the precipitate which formed was removed by suction filtration. When purified by crystallization from isopropanol the product melted at 216–217° C.

It should be noted that other heterocyclic groups may be substituted for the thienyl group of the specific example merely by starting with the desired heterocyclic compound and preparing the corresponding mercuric derivative thereof. Other substituents which may be substituted for the thienyl group of the specific example above cited, are, for example, pyridyl, furyl, piperidyl, quinolyl, 5-methoxythienyl, 3-chlorothienyl, thiapyranyl, thiazolyl, thiazolinyl. Generally any heterocyclic group containing up to 22 carbon atoms can be substituted.

Although the potassium salt of the imide is shown in the specific example, other alkali metal salts are equally suitable, as are even salts of other nonpreferred metals, such as those of the alkaline earth group. It is not necessary, moreover, to utilize the salt of the imide as illustrated in the specific example; the imide itself may be used directly in a mutual solvent with the mercury compound.

Another alternative in the present process is to react hexachlorocyclopentadiene as the diene with maleimide as the dienophile, said latter reactant thereby replacing the maleic anhydride of the specific example. This alternative eliminates the necessity of converting the adduct anhydride to the adduct-imide, since such imide is thereby formed directly.

The compounds of the present invention are useful as pesticides and in particular are potent fungicides and may be utilized and applied as the sole active ingredients in carriers such as dusts, solvents, aqueous dispersions or other carriers frequently used in the art. In addition, the compounds of the present invention can be used in combination with other insecticides or fungicides.

I claim as my invention:

1. As a new composition of matter a compound having the formula

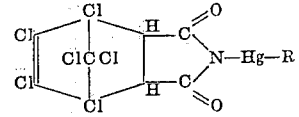

wherein R is a heterocyclic radical selected from the group consisting, of thienyl, pyridyl, furyl, piperidyl, quinolyl, 5-methoxythienyl, 3-chlorothienyl, thiapyranyl, thiazolyl, thiazolinyl.
2. As a new composition of matter N-(α-thienylmercuri) - 1,2,3,6 - tetrahydro-3,6-endomethano-3,4,5,6,7,7-hexachlorophthalimide, having the following structure
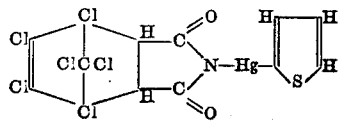
References Cited in the file of this patent
UNITED STATES PATENTS
| Number | Name | Date |
|---|---|---|
| 2,087,960 | Andersen | July 27, 1937 |
| 2,598,562 | Kleiman | May 27, 1952 |